United States Patent [19]

Kurata et al.

[11] Patent Number: 4,532,551
[45] Date of Patent: Jul. 30, 1985

[54] PICTURE INFORMATION READING APPARATUS

[75] Inventors: Masami Kurata; Takashi Ohmori, both of Kanagawa, Japan

[73] Assignee: Fuji Xerox Co., Ltd., Tokyo, Japan

[21] Appl. No.: 455,460

[22] Filed: Jan. 4, 1983

[30] Foreign Application Priority Data

Jan. 8, 1982 [JP] Japan ................................ 57-914

[51] Int. Cl.³ ............................................... H04N 1/24
[52] U.S. Cl. .................................. 358/293; 358/294; 382/44
[58] Field of Search ............... 358/293, 294, 213, 280; 382/44

[56] References Cited

U.S. PATENT DOCUMENTS 4,092,632 5/1978 Agulnek ............................ 358/294
4,249,217 2/1981 Korte ................................. 382/44
4,370,641 1/1983 Kantor .............................. 358/212
4,449,149 5/1984 Ogawa .............................. 358/284
4,449,151 5/1984 Yokota ............................. 358/293

Primary Examiner—Howard W. Britton
Attorney, Agent, or Firm—Sughrue, Mion, Zinn, Macpeak, and Seas

[57] ABSTRACT

An information reader has a number of linear image sensors dividing one line of picture information into as many parts for reading an original. As these sensors may be relatively shifted in the subscanning direction, signal delay devices are provided corresponding to the sensors for delaying a read out signal by an amount corresponding to the respective shift of the image sensors. The invention removes severe constraints on the placement and alignment of the sensors, facilitating installation and maintenance.

3 Claims, 4 Drawing Figures

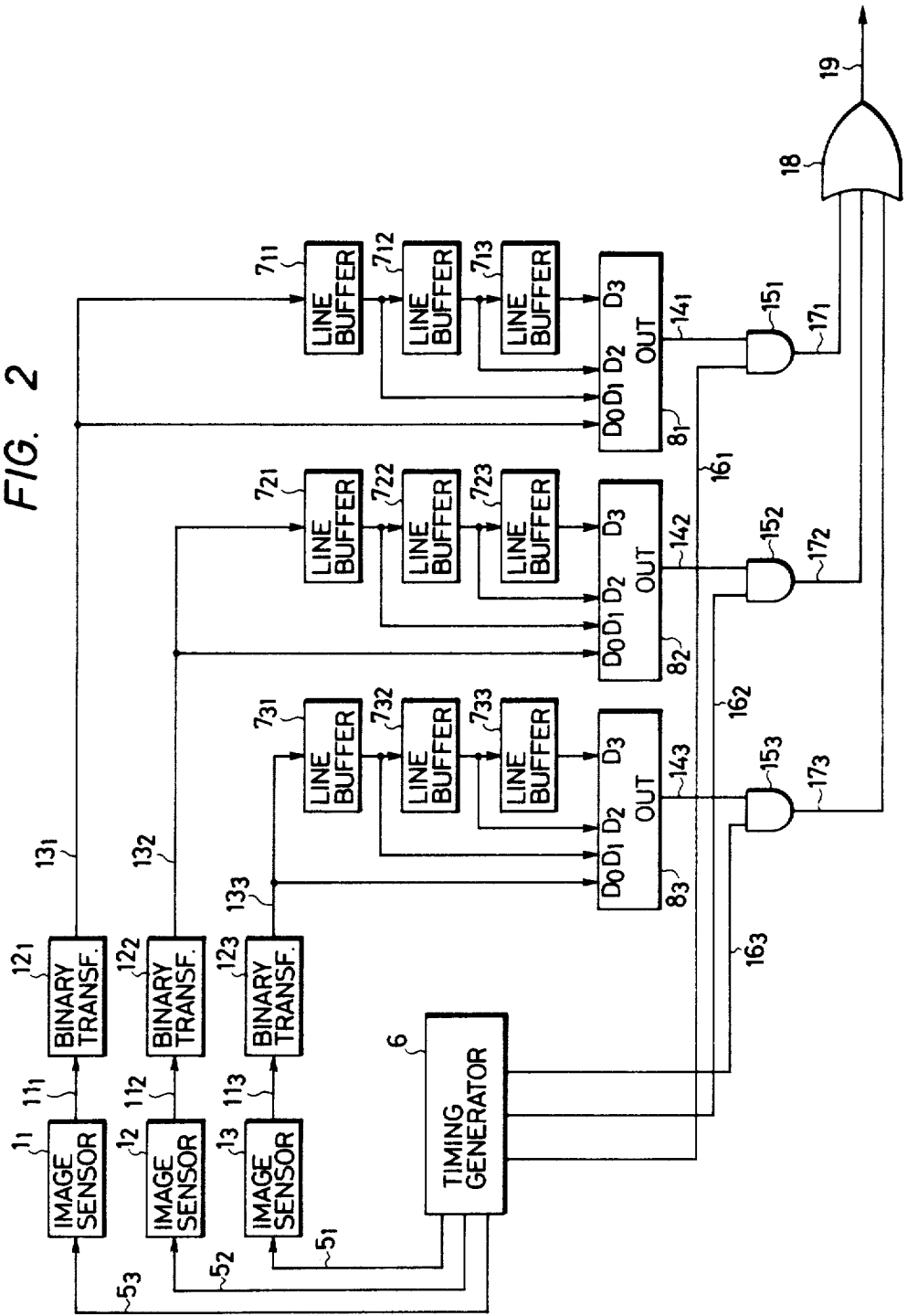

PICTURE INFORMATION READING APPARATUS

BACKGROUND OF THE INVENTION

The present invention relates to a picture information reading apparatus for reading picture information by successive scanning using a plurality of linear image sensors.

In a picture image reading apparatus for reading picture information by successive scanning (raster scanning), generally, a plurality of linear image sensors (hereinafter merely referred to as image sensors) such as charge coupled devices (CCDs) are disposed in the main scanning direction of an original document, and picture signals produced by these image sensors are connected to form a single line of a serial picture signal.

FIG. 1 shows the arrangement of an optical system of such apparatus. In this apparatus, three image sensors $1_1$, $1_2$ and $1_3$ are employed and three lenses $2_1$, $2_2$ and $2_3$ are provided respectively corresponding to the image sensors. The picture information on an original document 3 is divided into three parts in the main scanning direction and the three image sensors $1_1$-$1_3$ read these three parts, respectively, correspondingly through the lenses $2_1$-$2_3$. In such a conventional reading apparatus, the following has been required of the optical system:

(1) The respective focuses of the lenses $2_1$-$2_3$ should be correctly matched to the corresponding image sensors $1_1$-$1_3$;

(2) The respective image sensors $1_1$-$1_3$ should be disposed at a predetermined interval in the main scanning direction so that one line of picture information can be equally divided into three parts; and (3) The respective image sensors $1_1$-$1_3$ should be arranged in a straight line in the main scanning direction.

Requirement (3) requires the satisfaction of the following two particular conditions:

(i) The respective image sensors $1_1$-$1_3$ should be disposed in the main scanning direction; and (ii) The respective image sensors $1_1$-$1_3$ should be aligned in a straight line.

Accordingly, the adjustment of the optical system has heretofore required a skilled operator and substantial time.

SUMMARY OF THE INVENTION

The present invention has been achieved in view of the above-mentioned drawbacks of the conventional apparatus, and an object of this invention is to provide a picture information reading apparatus in which the adjustment of a plurality of image sensors in the main scanning direction can be simplified.

According to the present invention, there are provided, for each of the plurality of image sensors, a plurality of line buffers of a number of lines sufficient to correspond to the mechanical shift of the associated image sensor in the subscanning direction, so that the mechanical shift can be electrically corrected by changing the number of lines stored in the line buffers. Thus, it is not necessary to arrange the image sensors in an exact straight line, and it will suffice to merely dispose them in parallel with the main scanning direction, to thereby attain the above-mentioned object of the invention.

BRIEF DESCRIPTION OF THE DRAWINGS

FIG. 2 is a block diagram showing a circuit configuration of the picture information reading apparatus according to the invention;

DETAILED DESCRIPTION OF THE PREFERRED EMBODIMENTS

FIG. 2 shows the circuit configuration of a picture information reading apparatus according to a preferred embodiment of the present invention. The apparatus comprises first to third image sensors $1_1$-$1_3$, a timing generating circuit 6 for supplying the image sensors $1_1$-$1_3$ with respective start signals $5_1$-$5_3$ to start the transfer of picture image signals, line buffer groups $7_{11}$-$7_{33}$ for providing a picture signal delay, first to third data selectors $8_1$-$8_3$ for selecting a desired one or ones of the picture signals, and other circuit elements.

Figure 1:
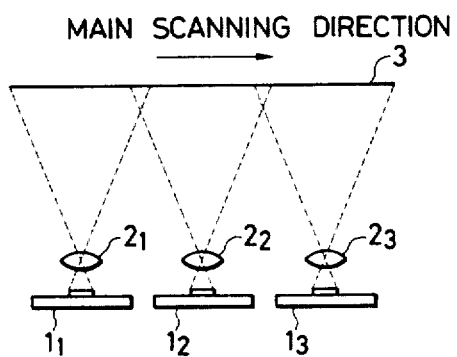
FIG. 1 is a plan view showing the arrangement of an optical system in a picture information reading apparatus provided with a plurality of image sensors.
Figure 3:
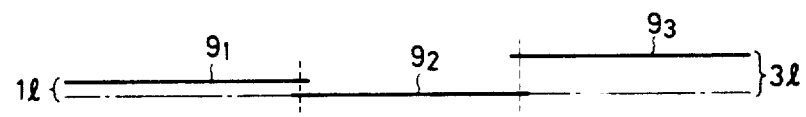
FIG. 3 is a diagram showing lines to be read by the respective image sensors.

Assume now that, when the optical system of this apparatus is checked after adjustment of the optical system has been completed, it is found that the reading positions of the respective image sensors $1_1$-$1_3$ are relatively shifted in the subscanning direction. Further assume in particular that, as shown in FIG. 3, the line $9_1$ to be read by the first image sensor $1_1$ is shifted by a distance of one line (1l) from line $9_2$, and that the line $9_3$ to be read by the third image sensor is shifted by three lines (3l), again with line $9_2$ read by the second image sensor regarded as a reference line. In this case, the operator adjusts the apparatus such that the first, the second and the third data selectors $8_1$, $8_2$ and $8_3$ are set to select picture signals inputted to a first, a zero-th and a third input terminal $D_1$, $D_0$ and $D_3$, respectively.

Figure 4:
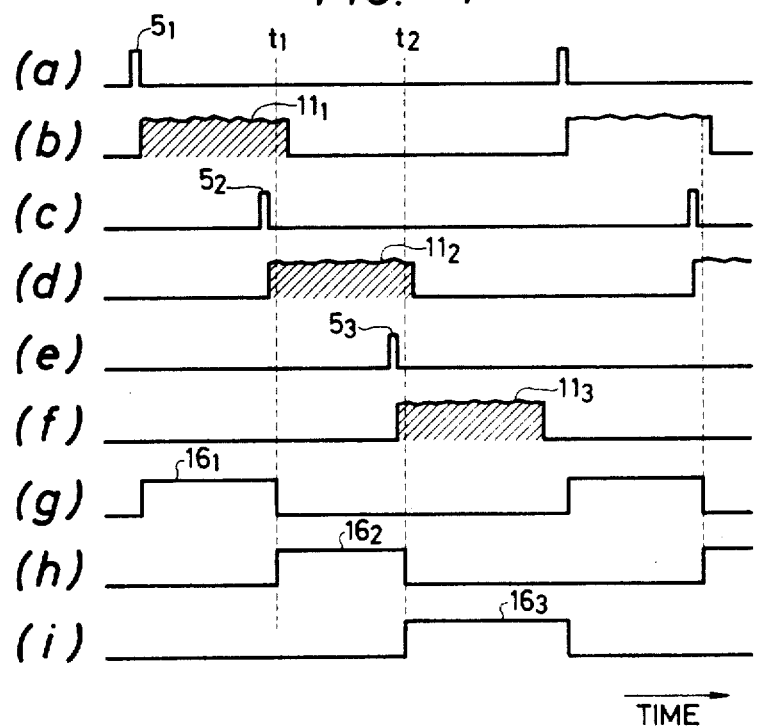
FIG. 4 is a time chart showing waveforms for explaining the operation of the circuit shown in FIG. 2.

Assume that the power supply for this apparatus is turned on after the above-mentioned adjustment has been completed. The timing generating circuit 6 produces three start signals $5_1$-$5_3$ at the respective timings a, c and e as shown in FIG. 4. The first start signal $5_1$ is applied to the first image sensor $1_1$ so as to initiate, at this timing, the transfer of one-third of a line as a first analog picture signal $11_1$ (FIG. 4b). Having been transformed into a two-valued signal by a first binary transformation circuit $12_1$, the first analog picture signal $11_1$ is outputted as a first digital picture signal $13_1$. Each of the second and third start signals $5_2$ and $5_3$ is generated after the lapse of a predetermined time from the first start signal, as is necessary to make the time positions of the respective image sensors $1_1$-$1_3$ agree in the main scanning direction. The thus generated second and third start signals $5_2$ and $5_3$ are applied to the second and third image sensors $1_2$ and $1_3$, respectively. In response to the start signals $5_2$ and $5_3$, the transfer of second and third analog signal $11_2$ and $11_3$ (FIG. 4(d), (f)) are initiated, respectively. The timings are set such that the back end portion of the first analog picture signal $11_1$ and the fore end portion of the second analog picture signal $11_2$ overlap on each other, and such that the back end portion of the second analog picture signal $11_2$ and the fore end portion of the third analog picture signal $11_3$ similarly overlap on each other, so as to prevent the original document from being discontinuously read at its divided boundary portions.

The first to third digital signals $13_1$-$13_3$ are respectively applied to the corresponding data selectors $8_1$-$8_3$ at their individual zero-th input terminals $D_0$ as well as to the corresponding first line buffers $7_{11}$, $7_{21}$ and $7_{31}$ so as to be stored therein. Each of the line buffers $7_{11}$, $7_{21}$ and $7_{31}$, similarly to the other line buffers, is constituted by a shift register for storing a corresponding one of the three picture signals respectively produced from the binary transformation circuits $12_1$-$12_3$. The outputs of the first line buffers $7_{11}$, $7_{21}$ and $7_{31}$ are respectively applied to the data selectors $8_1$-$8_3$ at their individual first input terminals $D_1$ as well as to the corresponding second line buffers $7_{12}$, $7_{22}$ and $7_{32}$. Upon the generation of the next start signals $5_1$-$5_3$ by the timing generating circuit 6, the second line buffers $7_{12}$, $7_{22}$ and $7_{32}$ respectively receive data transferred from the corresponding first line buffers $7_{11}$. $7_{21}$ and $7_{31}$ in synchronism with the corresponding start signals $5_1$-$5_3$. That is, the second line buffers $7_{12}$, $7_{22}$ and $7_{32}$ are supplied with digital picture signals respectively delayed by a time corresponding one line, in comparison with the digital signals $13_1$-$13_2$ produced from the binary transformation circuits $12_1$-$12_3$.

The outputs of the second line buffers $7_{12}$, $7_{22}$ and $7_{32}$ are respectively applied to the data selectors $8_1$-$8_3$ at their individual second input terminals $D_2$ as well as to the corresponding third line buffers $7_{13}$, $7_{23}$ and $7_{33}$. These digital picture signals respectively applied to the third line buffers $7_{13}$, $7_{23}$ and $7_{33}$ are delayed by a time corresponding to two lines in comparison with the corresponding digital picture signals $13_1$, $13_3$ produced from the binary transformation circuit $12_1$-$12_5$. The outputs of the third line buffers $7_{13}$, $7_{23}$ and $7_{33}$ are respectively applied to the data selectors $8_1$-$8_3$ at their individual third input terminals $D_3$. The digital picture signals outputted from the third line buffers $7_{13}$, $7_{23}$ and $7_{33}$ are respectively delayed by a time corresponding to three lines in comparison with the digital picture signals $13_1$-$13_3$.

Each of the data selectors $8_1$-$8_3$ is supplied with four kinds of digital picture signals, and selects only one of these digital picture signals to produce a selected digital picture signal at its output terminal OUT. The thus produced first to third digital picture signals $14_1$-$14_3$ are respectively applied to first to third 2-input AND circuits $15_1$-$15_3$ which are respectively also supplied with first to third validating signals $16_1$-$16_3$ generated by the timing generating circuit 6 at the timings respectively shown at FIGS. 4g–i.

The first validating signal $16_1$ is produced within a period during which the first analog picture signal $11_1$ is being produced so that the first AND circuit $15_1$ may produce a first digital picture signal $17_1$ of the same period as the first validating signal $16_1$. The first digital picture signal $17_1$ is delayed by a time corresponding to one line in comparison with the first digital picture signal $13_1$ produced from the first binary transformation circuit $12_1$.

The first digital picture signal $17_1$ is turned off by the falling of the first validating signal $16_1$ at a predetermined time $t_1$, at which time the generation of the second digital picture $14_2$ is initiated. In place of the first digital picture signal $17_1$, a second digital picture signal $17_2$ is produced from the second AND circuit $15_2$ by the second validating signal $16_2$ which rises at this point of time $t_1$. The second digital picture signal $17_2$ is delayed by a time corresponding to two lines in comparison with the second digital picture signal $13_2$ produced from the second binary transformation circuit $12_2$.

Similarly, the second digital picture $17_2$ is switched off by the falling of the second validating signal $16_2$ at a predetermined time $t_2$ at which time the generation of the third digital picture signal $14_3$ is initiated. In place of the second digital picture signal $17_2$, a third digital picture signal $17_3$ is produced from the AND circuit $15_3$ by the third validating signal $16_3$ which rises at this point of time $t_2$. The third digital picture signal $17_3$ is delayed by a time corresponding to three lines in comparison with the third digital picture signal $13_3$ produced from the first binary transformation circuit $12_3$.

The thus successively produced first to third digital picture signals $17_1$-$17_3$ are supplied to an OR circuit 18. The OR circuit 18 produces at its output a digital picture signal 19 which is a continuous signal of one line, and which is not shifted in the subscanning direction.

As described above, according to the present invention, it is not necessary to effect adjustment to cause the respective image sensors to perfectly align in a straight line, whereby productivity is improved and a highly accurate reading apparatus can be produced.

What is claimed is:

1. A picture information reading apparatus, comprising; a plurality of linear image sensors for dividing one line of picture information into parts in a main scanning direction, so as to respectively read said one line of picture information in said parts, and picture signal delaying means provided respectively corresponding to said plurality of linear image sensors, for correcting a subscanning direction shift in reading positions between said image sensors by delaying picture signals by an amount corresponding to said shift, whereby the picture signal produced from each of said linear image sensors is corrected by said picture signal delaying means so that corrected picture signals are successively read, wherein each said picture signal delaying means comprises a data selector and a plurality of serially connected shift registers, an output of each said register being applied to said data selector.

2. An apparatus as claimed in claim 1, said picture signals being applied directly to said data selectors, bypassing said shift registers.

3. An apparatus as claimed in claim 1, further including timing generator means for outputting validating signals, and gate means receiving said validating signals as well as output signals from said data selector means.

* * * * *